United States Patent
Wu et al.

(10) Patent No.: US 12,156,846 B2
(45) Date of Patent: Dec. 3, 2024

(54) SMART WALKER

(71) Applicant: THE UNIVERSITY OF HONG KONG, Hong Kong (CN)

(72) Inventors: Chuan Wu, New Territories (CN); Jia Pan, New Territories (CN); Chongyu Zhao, Hong Kong Island (CN); Zhong Shen, Kowloon (CN); Xiaoyang Zhao, Hong Kong Island (CN); Dongmo Hu, Hong Kong (CN)

(73) Assignee: THE UNIVERSITY OF HONG KONG, Hong Kong (CN)

( * ) Notice: Subject to any disclaimer, the term of this patent is extended or adjusted under 35 U.S.C. 154(b) by 337 days.

(21) Appl. No.: 17/832,314

(22) Filed: Jun. 3, 2022

(65) Prior Publication Data
US 2022/0387246 A1    Dec. 8, 2022

Related U.S. Application Data

(60) Provisional application No. 63/196,718, filed on Jun. 4, 2021.

(51) Int. Cl.
*A61H 3/04* (2006.01)
*B60G 17/0165* (2006.01)
*G05D 1/00* (2006.01)

(52) U.S. Cl.
CPC .......... *A61H 3/04* (2013.01); *B60G 17/0165* (2013.01); *G05D 1/0214* (2013.01);
(Continued)

(58) Field of Classification Search
CPC ....................................................... A61H 3/04
See application file for complete search history.

(56) References Cited

U.S. PATENT DOCUMENTS

| 7,484,740 | B2 * | 2/2009 | Miller | A61H 3/04 |
| | | | | 135/65 |
| 7,540,342 | B1 * | 6/2009 | Ein | A61H 3/04 |
| | | | | 180/19.1 |

(Continued)

OTHER PUBLICATIONS

Ferrari, Francesco, et al. "Human-robot interaction analysis for a smart walker for elderly: The ACANTO interactive guidance system," International Journal of Social Robotics 12.2 (2020): pp. 479-492.

(Continued)

*Primary Examiner* — Noah Chandler Hawk
(74) *Attorney, Agent, or Firm* — Leason Ellis LLP

(57) ABSTRACT

A smart walking assistance device with a walker frame having generally vertical sides and an intersecting front. Wheels located at both ends of a bottom edge of the sides. A soft robotic sensing handle extends in a C shape along the upper edges of the sides and front. The sensing handle has multiple contiguous air filled chambers, each containing a pressure sensor for producing a pressure signal representing the pressure within the chamber. A microcontroller unit receives the pressure signals from the pressure sensors of the handle chambers and determines the status of at least one of the device and a user of the device based on the pressure signals. A stabilization mechanism is driven by the microcontroller so as to stabilize the walker in response to the determined status of at least one of the walker and the user.

22 Claims, 4 Drawing Sheets

(52) U.S. Cl.
CPC .............. *A61H 2201/1207* (2013.01); *A61H 2201/1215* (2013.01); *A61H 2201/1635* (2013.01); *A61H 2201/1659* (2013.01); *A61H 2201/5069* (2013.01); *A61H 2201/5071* (2013.01); *A61H 2201/5082* (2013.01); *A61H 2201/5092* (2013.01); *A61H 2203/0406* (2013.01); *A61H 2203/0468* (2013.01); *A61H 2230/06* (2013.01); *A61H 2230/625* (2013.01)

(56) References Cited

U.S. PATENT DOCUMENTS

| | | | | |
|---|---|---|---|---|
| 7,826,983 | B2* | 11/2010 | Alwan | B62B 5/0026 |
| | | | | 702/33 |
| 9,186,289 | B2* | 11/2015 | Nicholas | B62H 1/06 |
| 9,770,380 | B1* | 9/2017 | Dalton | A61H 3/04 |
| 10,322,054 | B2* | 6/2019 | McGrath | G08B 21/0461 |
| 2008/0072942 | A1* | 3/2008 | Warren | G08B 21/0461 |
| | | | | 135/66 |
| 2014/0365033 | A1* | 12/2014 | Masaki | A61G 5/048 |
| | | | | 701/2 |
| 2016/0253890 | A1* | 9/2016 | Rabinowitz | G08B 21/0461 |
| | | | | 340/539.13 |
| 2019/0365592 | A1* | 12/2019 | Norton | A61H 3/04 |
| 2021/0370997 | A1* | 12/2021 | Lybbert | B62B 5/0409 |

OTHER PUBLICATIONS

Werner, Christian, et al. "Evaluating the sit-to-stand transfer assistance from a smart walker in older adults with motor impairments," Geriatrics & gerontology international 20.4 (2020): pp. 312-316.

Valadão, Carlos, et al. "A new controller for a smart walker based on human-robot formation," Sensors (2016) 16, 1116, 26 pages.

Luz, Clare, Tamara Bush, and Xiaoxi Shen, "Do canes or walkers make any difference? Nonuse and fall injuries," The Gerontologist (2017), 57, No. 2, pp. 211-218.

Zhao, Xiaoyang, et al. "A Smart Robotic Walker With Intelligent Close-Proximity Interaction Capabilities for Elderly Mobility Safety." Frontiers in Neurorobotics (2020), vol. 14, 7 pages.

* cited by examiner

SMART WALKER

CROSS REFERENCE TO RELATED APPLICATION

The present application claims the benefit of U.S. patent application Ser. No. 63/196,718 filed Jun. 4, 2021, which is hereby incorporated by reference in its entirety.

TECHNICAL FIELD

The present invention relates to walking assistance devices for supporting elderly or disabled persons while walking and, more particularly to a walker that utilizes artificial intelligence and multiple sensor data fusion to provide more reliable, convenient and functional walking assistance.

BACKGROUND

The ability of the elderly and disabled to safely care for themselves is gaining more attention these days due to the rapid rise in the elderly and disabled population. The elderly population will be over 2 billion by 2050. WHO (2018). World health statistics 2018: monitoring health for the sdgs, sustainable development goals 613 [Dataset] Wikipedia contributors (2020). Azimuth—Wikipedia, the free encyclopedia. [Online; accessed 614 8 Feb. 2020. Among all the daily life activities, walking is of crucial importance in enabling an active and independent quality of life for the disabled and aging population. Mobility support not only avoids a slow overall functional decline in the person, but also reduces health care costs by delaying premature institutionalization.

Many walking assistance devices have been developed to address this issue. However, most existing walking assistance products are designed by conventional methods with just a few rigid joints. As a result, so the level of assistance they can provide is very limited. See the articles by Ferrari, Francesco, et al. "Human-robot interaction analysis for a smart walker for elderly: The ACANTO interactive guidance system," *International Journal of Social Robotics* 12.2 (2020): 479-492; Werner, Christian, et al. "Evaluating the sit-to-stand transfer assistance from a smart walker in older adults with motor impairments," *Geriatrics & gerontology international* 20.4 (2020): 312-316; and Valadão, Carlos, et al. "A new controller for a smart walker based on human-robot formation," *Sensors* 16.7 (2016): 1116. However, these walkers face problems such as failing to provide sufficiently safe support or inconvenience during various modes of human-robot interactions. According to the article, Luz, Clare, Tamara Bush, and Xiaoxi Shen, "Do canes or walkers make any difference? Nonuse and fall injuries," *The Gerontologist* 57.2 (2017): 211-218, about 33% of people over 60 years of age experience falls at least once, despite the help of walkers.

Only a handful of walking assistant devices have intelligence and interactivity, and their price is out of the reach of most families. These include U.S. Pat. No. 10,850,401, entitled "Soft robotic actuators and methods of manufacturing the same," which has a mechanism that actively inflates a soft chamber to generate motion, while a soft sensing handle has a fixed amount of fluid, and passively changes shape due to holding pressure to give feedback and provide protection. U.S. Pat. No. 10,767,024, entitled "Soft actuator and methods of fabrication," discloses a method of producing a soft actuator. U.S. Pat. No. 10,780,591, entitled "Soft robotic actuators and grippers" discloses a soft sensor. U.S. Pat. No. 10,597,275, entitled "Soft robotic actuators for positioning, packaging, and assembling," discloses a mechanism used for positioning, packaging and assembling a walker. According to U.S. Pat. No. 10,576,643, entitled "Sensors for soft robots and soft actuators," a strain limiting layer is added in a soft actuator and sensors are embedded in the strain limiting layer. In U.S. Pat. No. 10,465,723, which is entitled "Soft robotic actuators" there is at least one wall of strain limiting, while the soft sensing handle has no strain limiting wall. Finally, in U.S. Pat. No. 10,385,886, entitled "Soft actuators and soft actuating devices" linear motion can be generated by deflation, wherein the soft sensing handle passively changes shape to measure user status and absorb force to protect the user.

In a previously designed smart walker disclosed in the article, Zhao, Xiaoyang, et al. "A Smart Robotic Walker With Intelligent Close-Proximity Interaction Capabilities for Elderly Mobility Safety," *Frontiers in Neurorobotics* 14 (2020), (the "Zhao design") the device had several fundamental functionalities. These were: 1) A novel mechanical structure with omnidirectional mobility design and reliable stability that can prevent a user from falling and offer sufficient falling protection; 2) An artificial-intelligence-based Front-Following model that can analyze a walker's movement by observing the user's gait through an infrared thermal camera, and then drive the walker following the user in front; 3) A reinforcement-learning based Sound Source Localization (SSL) that can detect the horizontal orientation of a sound source, enabling the user to summon the walker from a distant place; 4) A soft robotic handle that can act as an interface to predict the user's intention and detect a falling emergency, which can further activate the walker's falling protection.

An improved elderly/disabled walker with intelligence that is user-friendly and has an effective interface can largely improve the user experience, while having improved reliability, stability and convenience at an affordable price, would be of benefit in the art.

SUMMARY OF THE INVENTION

The present invention is directed to overcoming the instability and expense of prior systems with a smart robotic walker for the elderly and disabled. The smart walker comprises three parts, a soft robotic sensing handle, a microcontroller unit and stabilization mechanisms. The soft sensing handle is placed on the upper part of the smart walker, the microcontroller unit is placed in the front middle of the walker, and the stabilization mechanisms are placed at the bottom of the walker. The invention works as follows: The user puts two hands on the soft sensing handle, and the pressure sensors embedded in the multiple chambers of the soft handle measure the pressure in each chamber. Based on the pressure data, the microcontroller decides which state the user and walker are in and whether they belong in that posture. The smart walker will respond according to any inappropriate posture. For example, if the smart walker is tilted and the tilt angle exceeds a pre-set value, the microcontroller will send a control signal to trigger the stabilization mechanism, so that the smart walker is stabilized and the user is protected from a fall.

The soft robotic handle provides comfortable and stable support for the user and can offer protection if the user falls down. The soft robotic handle has an array of pressure sensors that monitor the user's status and intention. The stabilization mechanism is combined with the soft handle to give strong and robust support for the user. When the soft handle detects the user is about to fall, the stabilization mechanism is immediately triggered by the microcontroller, and supporting points on the sides and front of the smart walker are activated, so that the walker is absolutely fixed and can give support to the user.

The soft material used in the handle allows the user to interface with the smart walker in a safer and more comfortable manner. The stabilization mechanism follows a modular design (e.g., three units spaced about the walker and being separately activated). Also, the size of each unit is minimized so that the overall mechanism does not increase the overall size of the walker. Yet, the stabilization mechanism is strong and operates fast enough to provide support for the walker. By combining this handle with the new outrigger stabilizer design, the walker can avoid toppling over and can provide increased the stability.

The present invention may further include an infrared thermal camera that faces the user's lower leg and a Front Following model (FFM) unit that analyzes a series of images from the camera using a long short-term memory (LSTM) recurrent neural network design to collect walking data. This system can predict a user's walking gait and, along with sensor information from the soft robotic handle, the user's intention (e.g., whether the user is making a turn) with higher prediction accuracy and frequency than the prior art. The use of data from the camera and the handle sensors, i.e., data fusion, improves the walking assistance for the user. As a result, powered wheels on the bottom rear of the walker can lead it in front of the user at an anticipated speed and in an anticipated direction. Furthermore, by changing the walking information collection and calculation processes, this invention achieves a higher reaction frequency, causing the walker to perform better with higher gait prediction accuracy and efficiency.

In addition, a new sound source localization (SSL) unit is provided that includes a plurality of microphones toward the top of the walker and the bottom of the walker so as to calculate a direction of a sound source near the walker and the vertical displacement of the sound source. Thus, a user can issue a vocal summons for the walker if it is nearby. The walker using its motor driven wheels can then move toward the user so the user can mount the walker. Further, the SSL unit can determine vertical displacement of the user, i.e., whether the user is in a standing, seated or prone position (indicating a fallen user). An upgraded soft robotic handle has more pressure sensors that can collect more user and walker data and can provide fast and robust pressure feedback.

DETAILED DESCRIPTION

Figure 1:
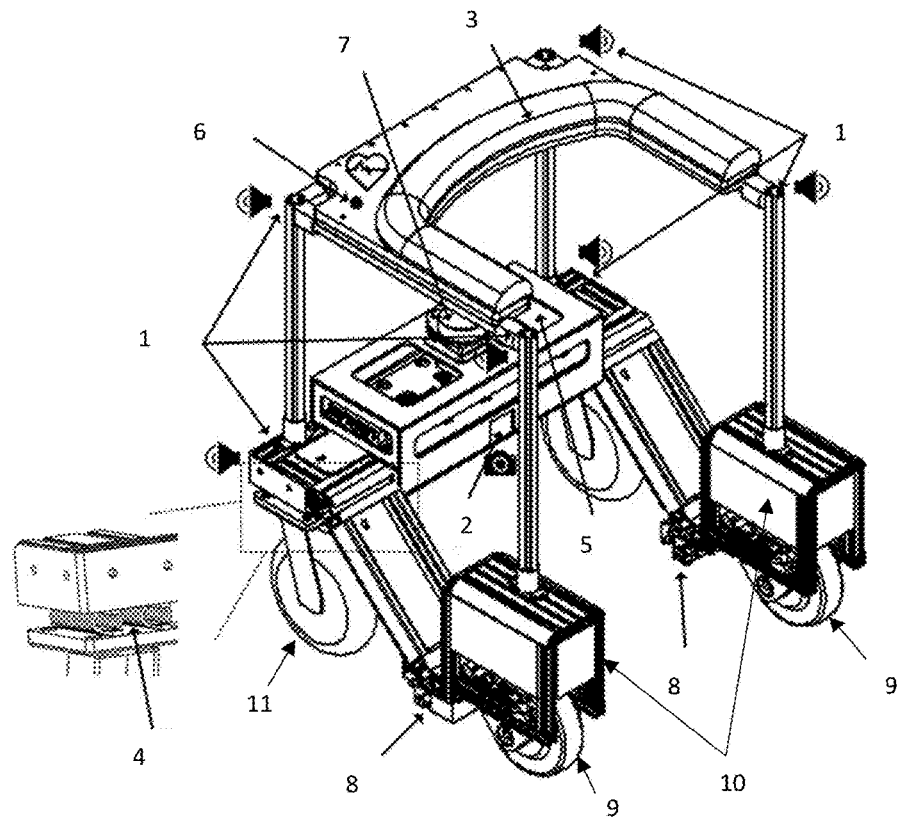
FIG. 1 is a rear, left, top perspective view of a walking assistance device or walker according to an embodiment of the present invention, wherein an insert shows an enlarged view of two parallel springs connecting the front wheel and the main part of the walker.

FIG. 1 shows an embodiment of the walker of the present invention and the location of the main sensors and mechanical parts. As is typical, the walker frame has two sides and one front structure that form a space in the middle where the user stands. Small wheels 9 are at the lower back of the frame and larger wheels 11 are at the lower front of the frame. The back wheels 9 can be driven by motors 10 located above each back wheel 9. These may be powered by a battery carried by the walker. A set of two parallel springs 4 (insert) connects a front wheel 11 to the main part of the walker on both sides. These springs ease travel over rough surfaces.

Three stabilization mechanism units 8 offer robust support for the walker when activated, e.g., when the walker is about to tip over. One each of the modules is placed on the left and right sides of the walker, and one of them is placed underneath the frame in the front.

A sectionalized soft robotic handle 3, which can be made of silica gel, is placed along the top edges of the frame. Each section of the handle 3 has its own air chamber. The sections are glued together one by one to form an integral C-shaped handle. Pressure sensors are located in each chamber to detect where along the handle 3 the user is gripping the handle and how hard.

A central platform 5 of the walker extends along the front between the two sides. This platform 5 contains a microcontroller (which may be one processor or a group of processors, batteries, and some sensors, e.g., a GPS sensor, an inertial measurement unit (IMU) sensor, and some infrared distance detection sensors. An infrared thermal camera 2 is set in the middle of the central platform at the front of the walker. It is pointed in the direction where the user stands. A heart rate sensor 6 may also be provided on the body of the walker. A light detection and ranging (lidar) sensor 7 is further located on the body and can scan the environment in a 2D plane.

The frame is equipped with 6 microphones 1, which can be of the same type, that detect sound signals from the user. Four of the microphones are at each corner of the top of the frame and two are located at the bottom of the frame in either the front or back. The sound signals collected by the microphones are analyzed in the microcontroller as part of a Sound Source Localization (SSL) software module that can locate the direction in which a user's voice is coming as part of a walker summoning system.

The walker performs as follows in a basic scenario:
a) Assuming the walker is away from the user in the beginning and the user may have fallen or it is not convenient for the user to move to the walker. According to one embodiment of the invention the walker is smart enough to react to a vocal summons from the user so as to cause it to move to a location near the user.
b) When the walker is nearby, the user grab it and start operating it, assuming the user is standing. If the user has fallen down, the user can lean on the walker or otherwise use the walker to recover from the fallen state.

c) When the user walks with the walker, the walker can offer sufficient and intelligent walking assistance by moving in front of the user at the user's estimated walking gait and can detect the user's intention and move in a direction indicated by that intention. Further, if the walker senses that the user is about to fail, e.g., there is an indication that the walker is starting to tip over, the walker can deploy stabilizing arms so as to study and protect the user and walker.

d) Simultaneously, because of the soft nature of the arm with which the user engages the walker, the user's experience is comfortable and intelligent.

The present invention includes several improvements compared to the prior art, one of which is the ability of the walker to move to the user. This is achieved by means of a reinforced learning-based Sound Source Localization (SSL) system that analyzes acoustic signals collected by the several microphones. When the user summons the walker, the microphones will receive the acoustic signals from the user's voice at different times. By analyzing the difference in the receiving times at different microphones, the system can calculate by triangulation the sound source direction, i.e., the direction from which the sound is coming. Based on this detection, the rear wheels of the walker can be driven to move the walker toward the sound source, i.e., the user. This SSL system may be a software module run on the microcontroller of the walker or a standalone processor.

In the prior Zhao design, the walker had only four microphones at different sites in the same horizontal plane. Therefore, the walker could not detect the height of the sound source. A feature of the present invention is that, by adding at least 2 microphones on different horizontal planes, the walker can detect the height of the sound source. As shown in FIG. 1 there are four microphones 1 set at the four corners of the walker's upper surface and two other microphones set beneath the others on the main body. The additional microphones give the walker the ability to detect whether the user is lying on the floor or not. Furthermore, in cooperation with the newly added functionalities of map building, obstacle avoidance, and navigation related to the lidar sensor 7 and other sensors in FIG. 1, the system can design a safe and quick route to move the walker to the user after the SSL calculates the sound source orientation.

The present invention further includes a novel recovery procedure and a user status detection. After the walker is near the user, the user can interact with the soft robotic handle 3 in FIG. 1 to recover from a fall. A feature of the soft robotic handle is that it has a larger detection area and more fall protection than the Zhao design. Also, the soft robotic handle is incorporated into an intelligent design so it can detect the fatigue, status, intention, and emergency of the user when the user is operating the walker. By monitoring the average maximum pressure value on chambers of the handle from the user within a preset period, the soft robotic handle 3 can tell that the user is becoming more and more tired when the pressure value is going higher and higher. When the user walks, the value and the patterns of the pressure applied to the handle are different from those when the user stands still. The walking intention can also be detected by comparing the value and changes of pressure on different areas of the handle, e.g., when the user turns left, the pressure on the left side will be larger than the pressure on the right side as the user leans more on the left. With a large detection range and a high detection frequency, the handle can detect abnormally large pressure and sharp pressure changes created by an emergency, e.g. a fall. When the soft handle installed on lower part of the walker is grabbed, it implies that the user may have fallen down and tried to raise him/herself up by grabbing those handles, which is an emergence case.

The present invention provides intelligent walking assistance. In particular, when the user is ready to operate the walker, the Front-Following system begins to work. It can detect and analyze the user's gait information for the walker control and can drive the walker to follow the user's gait while positioned in front of the user. A 24×32-pixels infrared thermal camera 2 (FIG. 1) is set in the middle of the front of the walker central platform 5 in order to capture thermal pictures of the user's lower limbs. Instead of using an optical camera, the infrared thermal images protect the user's privacy while capturing the main features of the user's gait. With the gait information, the Front-Following model leverages recurrent neural networks to achieve quick response and high accuracy of the control model.

In the prior Zhao design, there was a Front-Following model that used a deep neural network (DNN) model, instead of recurrent neural networks, to analyze data from the infrared thermal gait image and the leg position was collected by a lidar sensor. The lidar of the Zhao design has a low frequency of scanning, so it brings a low prediction frequency to the model. Further, the Zhao stabilization mechanism only consisted of a brake system which could fail to maintain the stability of the walker when it is pushed with a large horizontal force.

Figure 2:
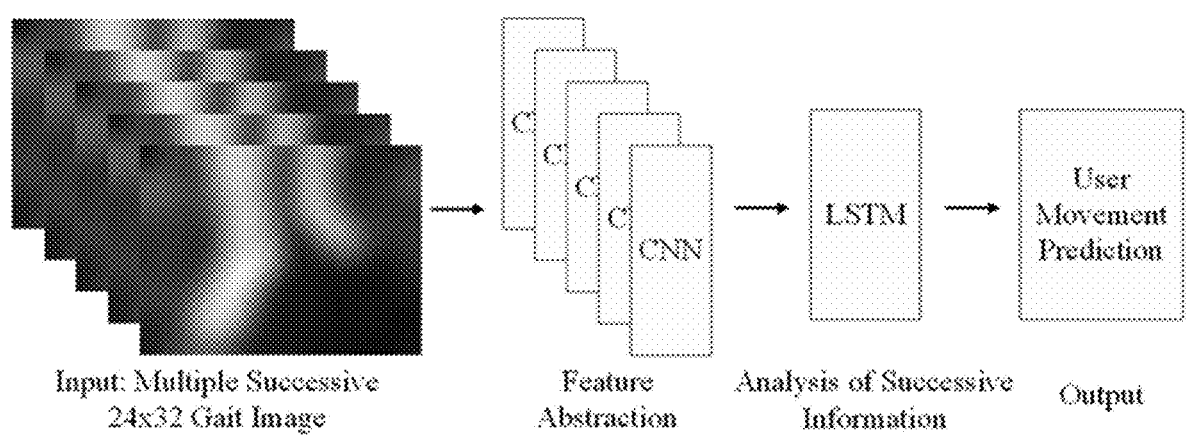
FIG. 2 illustrates a Front Following system used in conjunction with the walker of the present invention.

In the present invention the system of the Front-Following model, shown in FIG. 2, processes the infrared image data (multiple successive 24×32 gait images) to achieve a higher prediction frequency. The frequency limitation is only restricted by the frequency of the infrared thermal camera, which is faster than that used in the Zhao design.

To achieve higher prediction accuracy, the model of the present invention creatively uses a convolutional neural network ("CNN") to abstract image features and then uses a long short-term memory ("LSTM") recurrent neural network to analyze several successive frames of features. The LSTM results are output to the user movement prediction model to achieve Front-Following capability. The model applied in the present invention has over 96% network training accuracy while the network of the Zhao design only achieves about 90%. This feature causes the walker to provide more sufficient walking assistance. It does not require any sensors be connected directly to the user. The processing for the Front Following capability can be by means of a software module executed on the microprocessor 20 of the walker. It can also be executed on a standalone processor.

According to the present invention, data fusion functionalities are included to further improve walking assistance. In particular, a feature of the present invention is that it obtains some data fusion from different sensors. When the user walks, the pressure on the soft robotic handle changes. By adding the data from the soft robotic handle into the network, the Front-Following model can better predict the gait movement and the user's intention simultaneously. For example, when the user turns left, the gravity center will lean on the left more and the left side pressure will be larger.

The present invention also offers a more comfortable and safer walking interaction by the combination of the soft robotic handle and stabilization mechanism: In part this is achieved by offering sufficient walking support in different environments including indoor and outdoor situations. In this regard the structure has a shock mitigation systems, which are added to the two front wheels. Each wheel has two horizontal placed springs to maintain the stability of the walker. The shock mitigation system not only improves the user experience in rough environments, but also reduces noise signals in detecting pressure changes from the soft skin handle.

To enable the user to know about his/her situation, one novel feature of the present invention is that it includes a GPS sensor and a heart rate sensor. The GPS sensor can tell the user the walker's location when it's outdoors. The heart rate sensor can detect the user's heart rate by just placing his or her finger on it for a few seconds. These new sensors allow the user to monitor his/her situation clearly when operating the walker. This allows the walker and the user to detect more data and keep away from some potential dangers like a heart attack or getting lost.

Figure 3A:
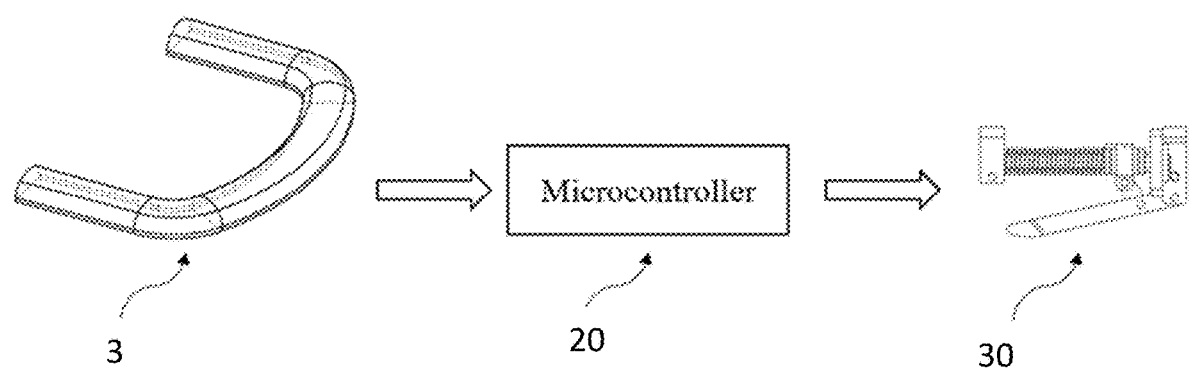
FIG. 3A is a schematic of the three essential components of a walker according to an embodiment of the present invention.
Figure 3B:
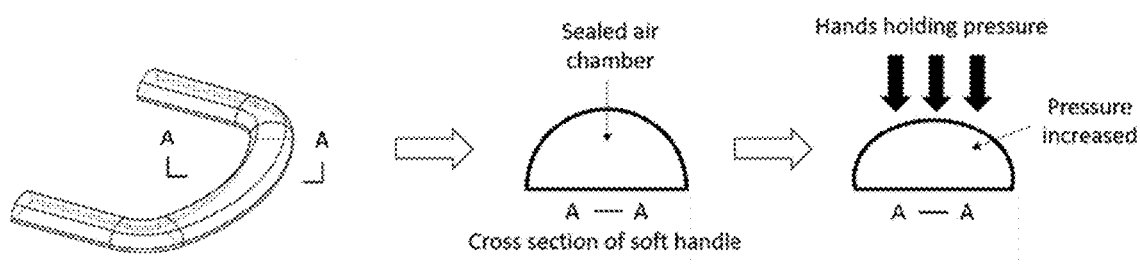
FIG. 3B shows the soft sensing handle, its cross section and the effect of pressure on it.

As shown in FIG. 3A, the soft sensing handle 3 is a combination of different sections, and each section has an individual air chamber. The shape of the soft sensing handle, and the number of sections within one handle are customizable, so that it can be put on different places on the smart walker to serve as both an interface and protection for the user. For the sake of easy understanding, a half-circle shape in cross-section is used to illustrate its working principle. Middle image of FIG. 3B. The soft handle body may be made of low-cost and skin-friendly silicone rubber, and it is made in a way so that an inner sealed chamber is created and air is trapped inside. When the user's hands are holding onto the soft handle, the holding pressure will cause the soft handle to deform (right most image of FIG. 3B), and the pressure inside the chamber will change accordingly. Each chamber's internal pressure is measured by a pressure sensor located in the chamber. Based on the pressure changing pattern, the system can tell which state the user is in, and thus it can determine the smart walker's working state. The air trapped inside chambers can provide fast and robust pressure feedback.

Figure 4A:
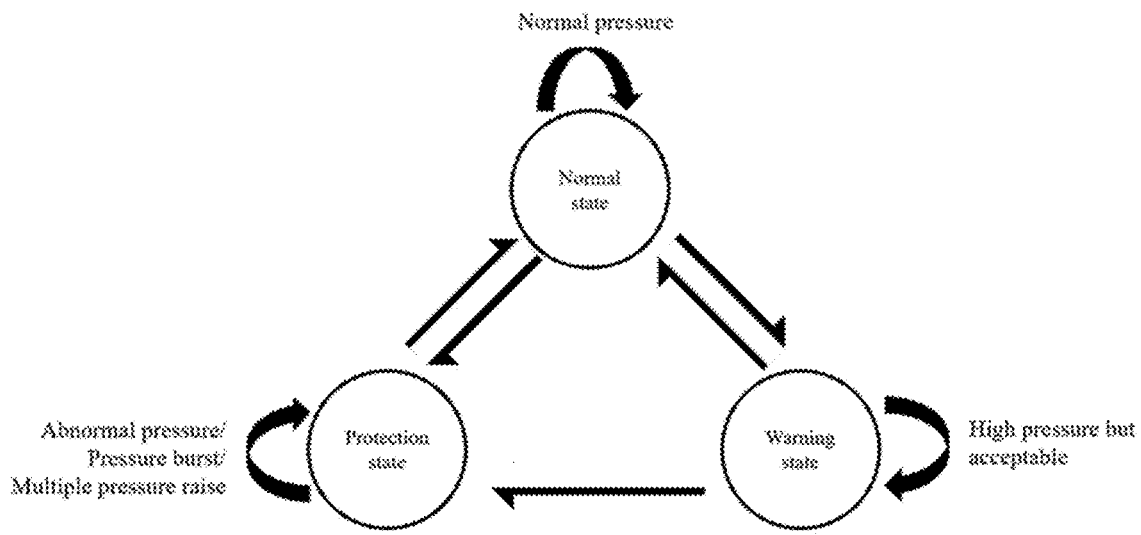
FIG. 4A is a diagram showing the three working states of the control of the microcontroller of the walker of the present invention and transitions between states.

In total there are three working states for the smart walker and they are shown in FIG. 4A. Any of the three states can transfer to another state except that the protection state cannot transfer to the warning state. In most cases the user will gently hold the soft handle with a pressure within the normal range. In that case, the system will be in the normal state and all functions can be performed normally. From the normal state, if pressure is largely increased but is still within the pre-set range and the change rate is also within an acceptable range, the system will change from normal state to warning state and certain maneuvering abilities are disabled.

There are three conditions for the system to enter the protection state: a) one or more pressure values have exceeded the acceptable range; b) one or more pressure sensors have a dramatically sudden increase; c) the number of pressure changes detected exceeds the pre-set value. If one or more of the above conditions is satisfied, the system will enter the protection state, regardless of which state the system was in originally. When the system is in the protection state, all moving functions are disabled, i.e., the movement of the walker is stopped, and the system can provide support and protection of the user.

To release from the protection state, the user needs to gently put his/her hands on the soft sensing handle. This creates an unlocking pressure data pattern that will be detected. Upon detection of this pattern the system will transfer from the protection state to the normal state. The system can also transfer from the warning state to the normal state, and the triggering condition is that the pressure drops to the normal range. Under different states the smart walker will have different performance.

Figure 4B:
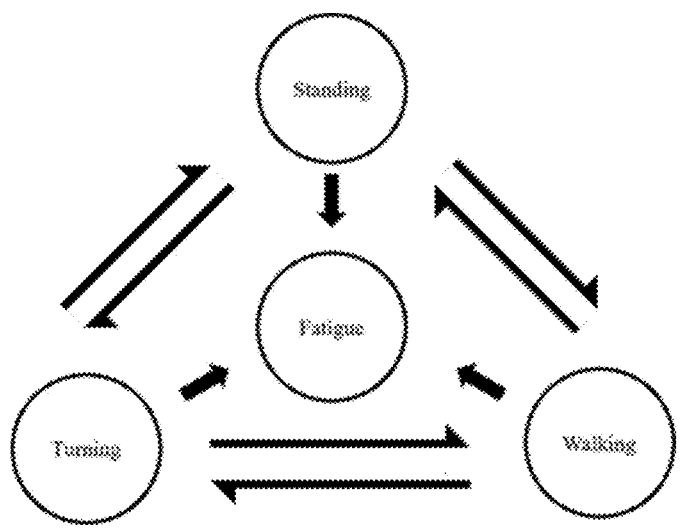
FIG. 4B is a diagram showing the four user states and transitions between them during use of the walker of the present invention.

The soft sensing handle can also be used as a user state monitor. There are four user states (shown in FIG. 4B) that can be categorized by pressure data acquired from the soft sensing handle. If the soft sensing handle has measured a series of constant and continuous pressure data, the user is standing with both hands holding onto the soft handle. If the pressure data follows a sinusoidal wave pattern, the user is walking with the smart walker. If one side of the soft sensing handle measures a larger pressure than the other side for a certain amount of time, the user is making a turn. If the mean pressure has risen substantially within a certain amount of time in any of the above three states, the smart walker will consider the user is tired and actions will be taken accordingly.

Figure 5:
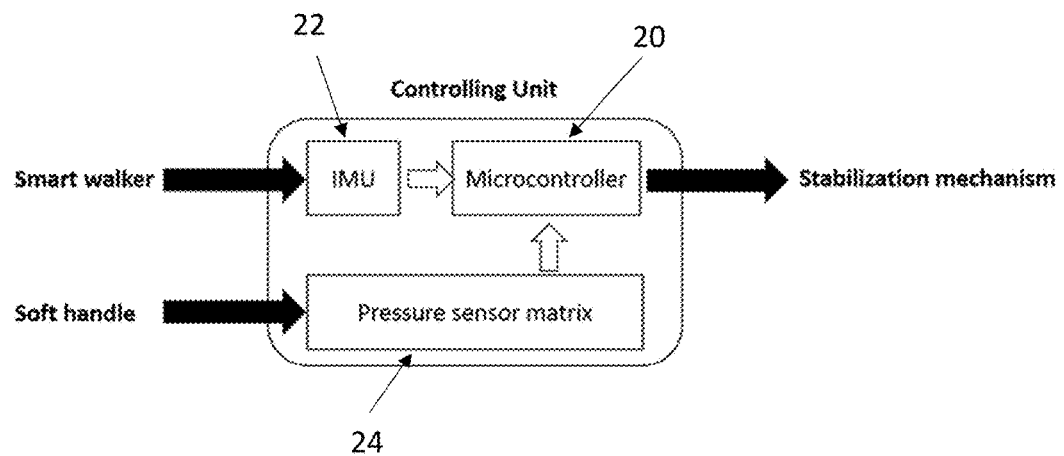
FIG. 5 is a block diagram of the control unit of the present invention.

As shown in FIG. 3A, the pressure signals from the soft sensing handle 3 are delivered to microcontroller 20, which determines what action the walker should take, including extending the arm or connecting rod 30 of stabilizer mechanism 8. The controlling unit used in this invention mainly has three essential parts, the microcontroller 20, an inertial measurement unit (IMU) 22, and pressure sensor matrix 24, as shown in FIG. 5. The pressure sensor matrix measures the pressures in the air chambers in the soft handle and sends the pressure signals to the microcontroller 20. The IMU 22 measures the orientation of the smart walker based on the pressure signals and sends data to the microcontroller. The microcontroller will control the smart walker and the stabilization mechanism 8 based on acquired data.

The functions of the stabilization controlling unit are as follows: a) The pressure data from the soft handle is measured by the pressure sensor matrix 24 and processed in the microcontroller 20. Then the microcontroller will decide which state the system is under. b) The orientation of the smart walker will be measured by the IMU 22 and transferred to the microcontroller. c) When the system is in the unlock state or ready state, data from the IMU will be ignored by the microcontroller. d) When the system is in the lock state, and the IMU detects that the smart walker is tilted, the microcontroller will activate the stabilization mechanism 8 to stabilize the smart walker and give solid support to the user.

Figure 6A:
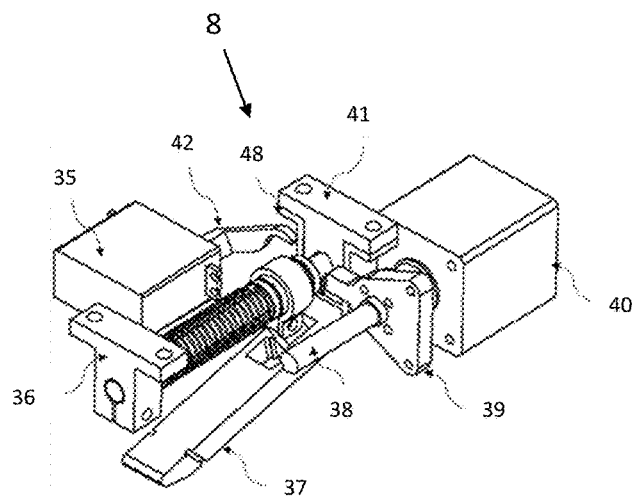
FIG. 6A is a perspective view of the stabilization mechanism of the present invention and FIG. 6B is a side view of the connecting rod of the stabilization mechanism.
Figure 6B:
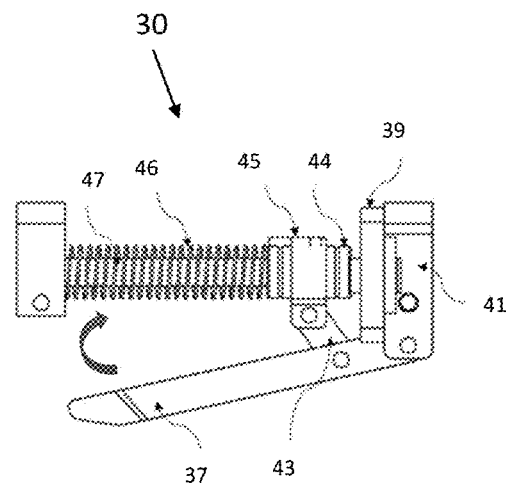

The stabilization mechanisms 8, which are shown in FIGS. 6A & 6B, follow a modular design. In the present embodiment of the invention the system is broken up into three modules which can be placed at any convenient location on the smart walker. In the present embodiment the modules 8 are mounted at the bottom left, bottom right, and bottom front of the walker. The mechanisms are designed such that the size is minimized so that it won't increase the overall size of the walker, yet it is strong and fast enough to provide support for the walker.

The parts of the stabilization mechanism 8 are: a servo motor 35, a shaft stand 36, the main stabilizing connecting rod 37, an extension shaft 38, a push rod 39, a stepper motor 40, a shaft stand 41, a push rod 42, a connecting rod 43, a linear bearing 44, a connecting rod 45, a spring 46, a shaft 47, and a connecting rod 48. This mechanism works as follows: During the normal state or ready state, the stabilization mechanism is in a default position where the connecting rod 37 is parallel with the ground. When the system enters the lock state, the stabilization mechanism is triggered. The servo motor 35 turns the push rod 42 up so that it doesn't block the connecting rod 48 anymore. Then the spring 46 will push the connecting rod 48 towards the shaft stand 41 and the connecting rod 43 will extend down and the connecting rod 37 will extend down from its parallel position toward the ground so as give support to the smart walker. This whole process is completed within 0.1 seconds to ensure the smart walker can stabilize quickly to give support and protection to the user. When the system is released from the lock state, the stepper motor 40 will drive the push rod 39 to push the connecting rod 37 back to its default parallel position. See the arrow in FIG. 6B. When the connecting rod 37 is at its default position, the servo motor 35 will rotate the push rod 48 down to lock the mechanism so no load is taken by the two motors at default position.

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A smart walking assistance device, comprising:
   a walker frame with generally vertical sides and an intersecting front, wheels are located at both ends of a bottom edge of the sides;
   a soft robotic sensing handle extending in a C shape along the upper edges of the sides and front, said sensing handle having multiple contiguous air-filled chambers each containing a pressure sensor for producing a pressure signal representing the pressure within the chamber;
   a microcontroller unit receiving the pressure signals from the pressure sensors of the handle chambers, a stability software module running on the microcontroller determining the status of at least one of the device and a user of the device based on the pressure signals; and
   a plurality of stabilization mechanisms placed about the bottom of the frame and driven by the stability software module of the microcontroller so as to stabilize the walker in response to the determined status of at least one of the walker and the user.

2. The smart walking assistance device of claim 1 operating according to the following steps:
   when a user puts both hands on the soft sensing handle, the pressure sensors measure the pressure in each chamber and produce a pressure signal;
   the stability software module of the microcontroller determines the state or posture of the user and/or walker based on the pressure signals from each chamber; and
   when the stability software module of the microcontroller determines that the user or walker are in an inappropriate state or posture, the stability software module of the microprocessor sends a control signal to trigger one or more of the stabilization mechanism units so that the smart walker is stabilized and the user is protected.

3. The smart walking assistance device of claim 2 operating according to the following additional steps:
   providing pressure data from the soft handle to the microcontroller, which determines what state the walker is in, i.e. an unlocked normal state or a locked emergency state;
   providing input from an inertial measuring unit (IMU) to the microcontroller to determine if the walker is tilted and whether the tilt angle exceed a preset value, if the walker is in the unlocked state, ignore the IMU signal;
   if walker is in the locked state and the IMU signal indicates that the walker is in a tilted state that exceeds the preset value, activate the stabilization mechanism to stabilize the smart walker and give solid support to the user.

4. The smart walking assistance device of claim 1 further including a plurality of microphones toward the top of the walker and the bottom of the walker and a sound source localization (SSL) software module of the microcontroller that detects the direction in which a person is located with respect to the walking assistance device based on triangulation of sound received in the microphones from the person while summoning the walker.

5. The smart walking assistance device of claim 4 wherein the SSL software module determines whether the person summoning the walker is in a prone position based on triangulation between the sound received from the microphones toward the top of the walker and those toward the bottom of the walker.

6. The smart walking assistance device of claim 4 further comprising a light detection and ranging (lidar) sensor that scans the environment surrounding the smart walker in a 2D plane and sends the lidar information to the microcontroller where it is used for map building and obstacle avoidance to design a safe and quick route to move the walker to the user after the SSL calculates the sound source orientation.

7. The smart walking assistance device of claim 1 further comprising:
   an infrared thermal camera that faces the user's lower leg; and
   a Front Following model (FFM) software module of the microprocessor that analyzes a series of images from the camera using a long short-term memory (LSTM) recurrent neural network design to collect walking data and predict a user's walking gait; and
   drive units for the rear wheels that are controlled by the FFM software module so as to cause the walker to move in front of the user at a speed based on the predicted walking gait of the user.

8. The smart walking assistance device of claim 7 wherein the FFM software module receives the pressure signals from the pressure sensors of the handle chambers and uses them to predict the user's intention, and
   wherein the FFM software module combines the walking gait data and the user intention data to predict the user's gait and direction and to control the wheel drive units to move the walker in front of the user at a speed based on the predicted walking gait of the user and in a direction based on the predicted intention of the user.

9. The smart walking assistance device of claim 1 further comprising a GPS sensor that provides information to the user as to the walker's geographic location.

10. The smart walking assistance device of claim 1 further comprising a light detection and ranging (lidar) sensor that scans the environment surrounding the smart walker in a 2D plane and sends the lidar information to the microcontroller where it is used for map building and obstacle avoidance so as to navigate the walker by selective drive to its wheels.

11. The smart walking assistance device of claim 10 further comprising infrared distance detection sensors whose signals are provided to the microcontroller which combines them with the lidar signals to improve the map building and obstacle avoidance.

12. The smart walking assistance device of claim 1 wherein the device has three stabilizing states, i.e., a normal unlocked state, a protection locked state and a warning state, and
   wherein the device can enter the protection state when: a) one or more pressure values from the soft robotic handle have exceeded an acceptable range; b) one or more pressure sensors have a dramatically sudden increase; and c) the number of pressure changes detected in a period of time exceeds the pre-set value;

wherein when the device is in the protection state, all moving functions are disabled and the system can provide support and protection of the user;

wherein the device is released from the protection state when the user gently puts hands on the soft robotic sensing handle to creates an unlocking pressure data pattern that transfers the device from the protection state to the normal state; and wherein the device transfers from the warning state to the normal state when the pressure drops to the normal range.

13. The smart walking assistance device of claim 12 further comprising an inertial measurement unit (IMU) sensor that measures the orientation of the smart walker and sends data to the microcontroller, when the walker is operating normally the data from the IMU is ignored by the microcontroller, and when the system is in the lock state, and the IMU detects that the smart walker is tilted, the microcontroller will activate the stabilization mechanism to stabilize the smart walker and give solid support to the user.

14. The smart walking assistance device of claim 1 further comprising a heart rate sensor mounted thereon which can detect the user's heart rate when the user places a finger on it for a few seconds.

15. The smart walking assistance device of claim 1 wherein the microcontroller is a single processor or a plurality of processors.

16. The smart walking assistance device of claim 1 wherein by monitoring the average maximum pressure value on chambers of the soft robotic handle by the user within a preset period, the microcontroller can determine whether the user is becoming more and more fatigued when the pressure value is going higher and higher.

17. The smart walking assistance device of claim 1 wherein by monitoring the average maximum pressure value on chambers of the soft robotic handle by the user within a preset period, the microcontroller can determine when the user walks by the value and the patterns of the pressure applied to the handle as distinguished from those when the user stands still.

18. The smart walking assistance device of claim 1 wherein by monitoring the average maximum pressure value on chambers of the soft robotic handle by the user within a preset period, the walking intention of the user can be detected by comparing the value and changes of pressure on different areas of the handle.

19. The smart walking assistance device of claim 1 wherein by monitoring the average maximum pressure value on chambers of the soft robotic handle by the user within a preset period, and emergency case for the user can be detected by as an abnormally large pressure and/or sharp pressure changes.

20. The smart walking assistance device of claim 1 further including two horizontal springs connecting each front wheel to the walker frame to maintain the stability of the walker in rough environments and to reduce noise signals during travel of the walker.

21. The smart walking assistance device of claim 1 wherein a stabilization mechanism comprises:

a main stabilizing connecting rod is parallel with the ground when the stabilization mechanism is in a default position;

when the stabilization mechanism is triggered, a servo motor rotates a push rod up so that it releases a first connecting rod;

a spring pushes the first connecting rod towards a shaft stand;

a second connecting rod hinged on the first connecting rod extends down and pushes the main stabilizing connecting rod 37 down from its parallel position toward the ground so as give support to the smart walker.

22. The smart walking assistance device of claim 21 wherein the stabilization mechanism further comprises:

a stepper motor, which when the device is released from the lock state, drives a second push rod to push the main connecting rod back to its default parallel position; and when the main connecting rod is at its default position, the servo motor rotates the first push rod back down to lock the mechanism so no load is taken by the two motors at the default position.

* * * * *